United States Patent Office 2,983,521
Patented May 9, 1961

2,983,521

VEHICLE SUSPENSION STABILIZER SPRING AUTOMATICALLY OPERABLE AS SUPPLEMENTARY SPRING

Joseph Dauben and Josef Müller, Stuttgart, Germany, assignors to Daimler-Benz Aktiengesellschaft, Stuttgart-Unterturkheim, Germany Filed May 18, 1954, Ser. No. 430,502

23 Claims. (Cl. 280—124)

Our invention relates to a vehicle and, more particularly, to an improved arrangement of the springs thereof.

As is well known, the operation of the springs of a motor vehicle will not be satisfactory to the same degree at all loads. Where the springs are properly dimensioned for a full load of the vehicle, they will not be sufficiently soft when the vehicle carries but a light load. Inversely, springs dimensioned to act in a satisfactory manner when the vehicle carries a light load, are liable, when operated with a full load, to be unduly flexed beyond the permissible limit. An ideal springing will require that the spring characteristic is variable depending on the load of the vehicle at any time. Since such a continuously variable characteristic cannot be obtained by practical means, recourse has been taken frequently to the provision of invariable main springs dimensioned to function properly for a load range extending from the minimum load to a median load, and of additional springs adapted to be rendered effective when the load approaches its maximum. It has been proposed to mount such additional springs in such a manner that they will bear on the axle after the main springs have been flexed to a certain degree. This arrangement involves the disadvantage, however, that under full load operating conditions the distance through which the wheels move up and down relative to the body of the vehicle is considerably reduced, the upper portion of such distance being eliminated, and that the road clearance differs with different loads.

It is an object of the present invention to provide an improved spring arrangement in which such disadvantages are avoided, the body of the vehicle, when under full load, being lifted to a normal road clearance by the actuation of means rendering an additional spring effective.

Further objects of the invention are to provide an actuating mechanism for that purpose which does not require power from the engine or the battery or manual power, but is supplied with the required energy from the up-and-down movement of one of the wheels, and to provide an additional spring having the dual function of an additional spring aiding the main springs under full load conditions and of a stabilizer spring responsive to differential up-and-down movements of opposite wheels.

Figure 1:
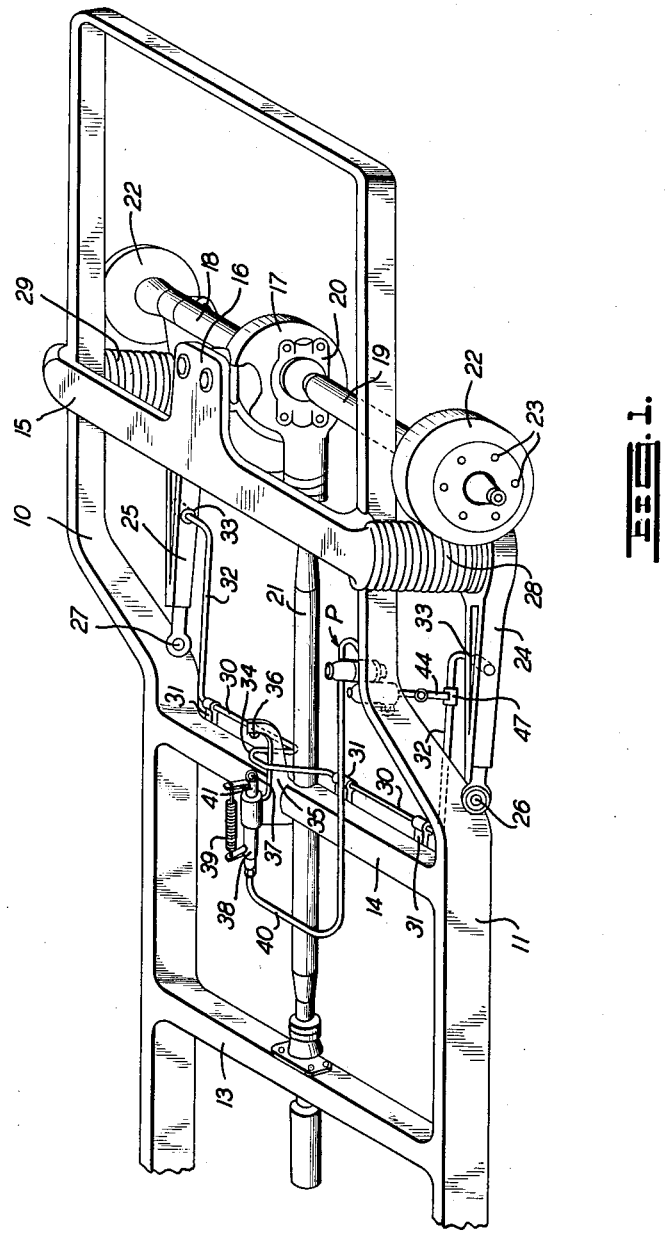
Figure 2:
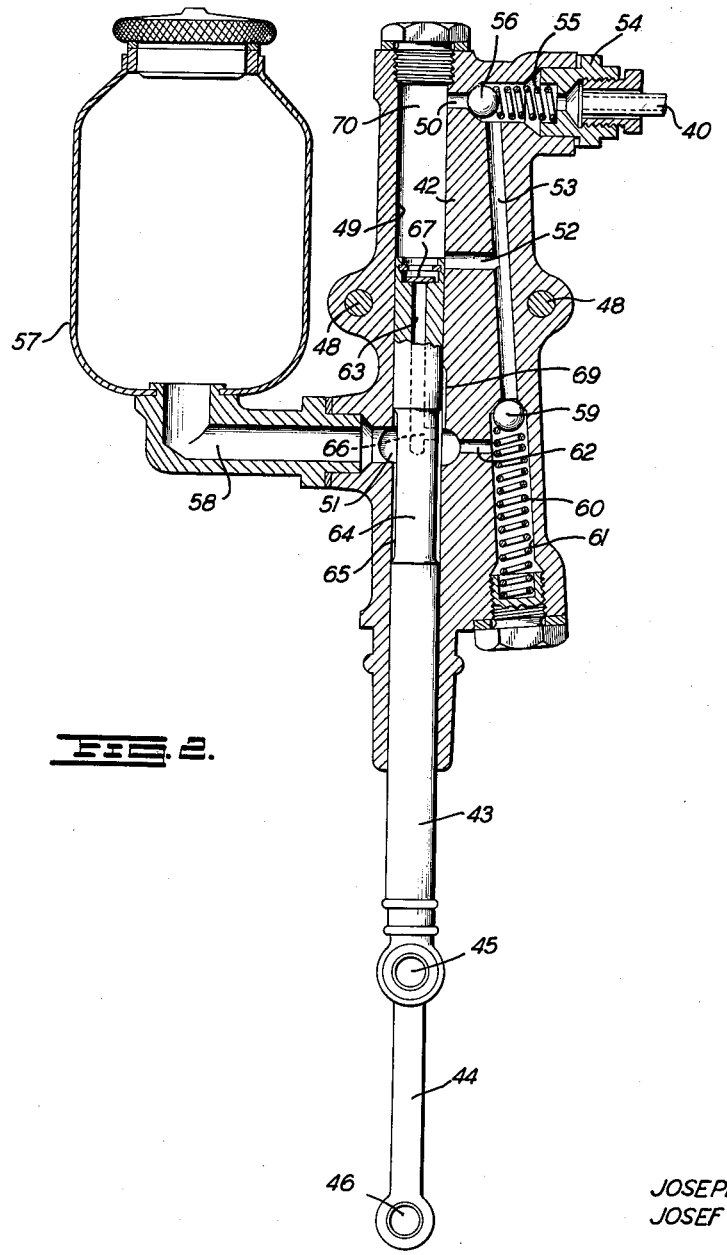

Further objects of our invention will appear from the description of a preferred embodiment of our invention illustrated in the accompanying drawings. However, it is to be understood that such detailed description serves the purpose of illustration of the invention rather than that of limitation thereof. In the drawings, Fig. 1 is a perspective view of the rear portion of the chassis of a motor vehicle, the wheel disks and tires being omitted, and Fig. 2 is a vertical section through a pump supplying fluid under pressure for the spring-actuating mechanism, such pump being viewed from the front.

A body, which in the embodiment shown constitutes a chassis frame but, if desired, may just as well constitute the body structure proper of the vehicle, is formed by a pair of longitudinal beams 10 and 11 connected by a number of transverse frame members, such as members 13, 14 and 15, extending between and being rigidly connected with the longitudinal beams 10 and 11. Beam 15 projects beyond the longitudinal beams 10 and 11 and between its ends is provided with a rearward extension 16 from which a rear axle transmission housing 17 depends which is suitably connected to the extension 16, rubber cushions being interposed therebetween. A pair of tubular half axles 18 and 19 extends from the housing 17 outwardly, each of such half axles being provided with opposite trunnions journalled in a bracket 20 fixed to the housing 17, the axle being thus mounted for pivotal motion about an axis extending fore and aft. In this manner, the half axles 18 and 19 are capable of independent oscillation within a vertical transverse plane of the vehicle. In each of the tubular half axles 18, 19 a shaft is journalled which is geared by a suitable differential gearing with a main drive shaft 21 which connects the transmission in housing 17 with the engine not shown.

The rear wheels of the vehicle are fixed on the ends of the shafts journalled in the tubular half axles 18 and 19. Each wheel comprises a brake drum 22 and the customary wheel disk and tire attached thereto by bolts 23. In order to relieve the brackets 20 and the trunnions journalled therein from the horizontal thrust, links 24 and 25 extend from the outer ends of the tubular half axles 18 and 19 forwardly. The front ends of such links are provided with eyes journalled on studs 26 and 27 projecting from the beams 10 and 11. The rear ends of the links 24 and 25 are suitably connected to the half axles 18 and 19 by means not shown in detail. Rearwardly of the studs 26 and 27 the beams 10 and 11 are so bent upwardly as to provide the required clearance between the body and the axles 18 and 19.

Upright helical springs 28 and 29 are inserted between the links 24, 25 and the ends of the transverse member 15 projecting outwardly from the beams 10 and 11. The springs 28 and 29 are so dimensioned as to be capable of lifting the body 10, 11 the required clearance above the axles 18 and 19, provided that the load carried by the vehicle does not exceed a median magnitude.

In order to reduce outward inclination of the vehicle body when the same is driven through curves, a stabilizer spring is provided which is flexed by differential up-and-down motion of the wheels 22. In the embodiment shown, such stabilizer spring is formed by a torsional rod 30 extending parallel to the transverse member 14 and being journalled in brackets 31 attached thereto. The ends of the spring rod 30 are provided with torsion-transmitting means for connection with the wheel-guiding members 24 and 25. In the embodiment shown, such torsion-transmitting means are formed by rearwardly extending parallel arms 32 which may be integral with the spring rod 30 and have outwardly bent ends 33 each engaging a rubber bushing inserted in a horizontal transverse bore of the wheel-guiding member or link 24, or 25 respectively. Between its ends the spring rod 30 is provided with a transverse extension. In the embodiment shown, the rod 30 is bent between its ends to form a loop 34 which constitutes such extension.

The torsional spring rod 30 constitutes a single additional spring provided in addition to the springs 28 and 29 which are individually coordinated to the wheels 22, such additional spring being normally freely movable relative to the body. However, a settable means is provided which may be set to an effective and to an ineffective position and, when in effective position, restrains the movement of the additional spring 30 relative to the body. Preferably, such settable means is formed by a clamp or vise mounted on the body.

In the embodiment shown, the clamp is formed by a bracket 35 mounted on the transverse member 14 between its ends and carrying a pair of stops 36 and 37. The stops are adapted to engage the extension 34 of the torsional spring rod 30 on opposite sides thereof. While the stop 36 is fixed to the bracket 35, the other stop 37 is movable towards and away from the stop 36. To this end, stop 37 is carried by a plunger 41 projecting from a horizontal cylinder 38 which is fixed to the bracket 35. A helical spring 39 which is extended between a hook fixed to plunger 41 and an ear projecting from cylinder 38 tends to pull plunger 41 forwardly away from the fixed stop 36. The forward end of cylinder 38 is connected by a conduit 40 to a pump P.

When fluid under pressure is fed by pump P through conduit 40 to the hydraulic ram constituted by cylinder 38 and plunger 41 the latter is urged rearwardly and will cause stop 37 to engage the extension 34 pressing the same against the fixed stop 36. When the conduit 40 is relieved from fluid pressure, however, the spring 39 will pull plunger 41 forwardly thereby opening the clamp or vise and rendering the clamp ineffective.

When the settable clamp is ineffective, thus permitting the additional spring 30 to freely turn relative to the body in its bearings 31, the spring does not assist the springs 28 and 29 in supporting the body on the wheels 22 and is not flexed by synchronous up-and-down movements of the wheels 22 relative to the body. This is true provided that the up-and-down movements of the wheels remain within normal limits. When the vehicle is driven through a curve, however, causing the body of the vehicle to incline outwardly under the effect of the centrifugal force, one of the wheels 22 will move upwardly, while the other wheel will move downwardly with respect to the body. In response to such differential up-and-down motion of the wheels the additional spring 30 is flexed and will thereby counteract and reduce such lateral inclination of the body. In this manner, the additional spring 30 will act as a stabilizer spring as long as it is free to turn bodily within its bearings 31. An additional stabilizer spring coordinated to the front wheels of the vehicle may be dispensed with because it does not make any difference regarding the lateral inclination of the body whether the stabilizer spring acts on the front wheels or on the rear wheels.

The lateral extension 34 cooperating with the stops 36 and 37 enables the additional spring 30 to perform another additional function. When both wheels 22 move up and down synchronously through equal distances, the extension 34 of the spring rod 30 will engage the stops 36 and 37, downward motion of the wheels bringing extension 34 to engagement with fixed stop 36, and upward motion of the wheels causing extension 34 to engage the settable stop 37.

As will be described later, the pump P will remain ineffective leaving stop 37 in its retracted forward position when the load carried by the vehicle does not exceed a median limit. In this position, the stop 37 is so far spaced from the normal position of extension 34 that engagement will not occur unless the wheels 22 move upwardly a considerable distance thereby flexing springs 28 and 29 an amount approaching the permissible limit. Upon engagement with the stop 37 the additional spring 30 will be flexed by continued upward movement of the wheels and will thus succor and assist the springs 28 and 29 individually coordinated to the wheels in supporting the body. Inversely, excessive downward movement of the wheels and consequent relief of springs 28 and 29 causes extension 34 to engage the fixed stop 36, whereupon the additional spring 30 will function to counteract continued downward movement of the wheels.

Hence, it will appear that the torsional spring rod 30 will act as an additional spring assisting the individual springs 28 and 29 when the load imposed on the vehicle amounts to a degree considerably less than the permissible maximum load. The additional spring 30 has such an effect upon the spring characteristic as to progressively increase the spring coefficient when the wheels move upwardly and to decrease the spring coefficient when the wheels move downwardly with respect to the body.

According to a further feature of the present invention, the additional spring rod 30 is utilized to reinforce springs 28 and 29 under full load conditions, irrespective of the distance through which the wheels 22 move upwardly or downwardly. To this end, the clamp or vise 36, 37 is closed by admission of fluid under pressure to the cylinder 38, whereby the stop 37 is moved rearwardly clamping the extension 12 of the torsional spring rod against stop 36. When the clamp is thus closed, the spring rod 30 is permanently effective to cooperate with the individual springs 28 and 29 in supporting the body on the wheels.

Let us assume that the two individual springs 28 and 29 be so dimensioned as to produce the desirable springing effect with two passengers seated on the front seats, the springs 28 and 29 ensuring the proper normal clearance between the half axles 18, 19 and the chassis frame 10 to 15 and ensuring soft riding qualities. Then, when the vehicle is loaded with four to five passengers plus baggage, the pump P will function as explained hereinafter to close the clamp restraining movement of the extension 34 of the additional spring 30 relative to the body. As a result, the spring 30 is so biased as to relieve the individual springs 28 and 29 to a certain extent thus restoring the normal clearance between the half axles 18, 19 and the chassis frame and restoring the soft riding qualities of the springs. Therefore, the wheels 22 are able to move through the same distance up and down relative to the chassis as they were with the smaller load of two passengers without baggage and with stop 37 retracted to ineffective position by spring 39 as shown.

The pump P constitutes a fluid-operable actuating mechanism which is coordinated to the settable means 37, 41 and adapted to adjust the same to effective position and is mounted for operation by up-and-down motion of one of the wheels. The pump P comprises a cylinder body 42 and a plunger 43. One of these two elements, preferably the cylinder body 42, is attached to the vehicle body by bolts 48, for instance to the longitudinal beam 11 thereof, while the other of the two elements, preferably the plunger 43, is connected to one of the wheels 22 for actuation by up-and-down movement thereof. In the embodiment shown, the plunger 43 is connected to the wheel 22 through the intermediary of a connecting rod 44, the arm 32 and the link 24, the connecting rod 44 having its upper end connected by a pin 45 to the lower end of plunger 43 and having its lower end connected by a pin 46 to a bracket 47 fixed on the arm 32 of the spring 30. Therefore, relative up-and-down movement of one of the wheels 22 results in a reduced corresponding up-and-down movement of plunger 43 in the cylinder body 42. The reduction of the movement is desirable in order to reduce the dimensions of the pump.

The cylinder body 42 is provided with a vertical bore 49 which slidingly accommodates the plunger 43 and has a pressure port 50 near its top, a suction port 51 located at a considerable distance therebelow, and a by-pass duct 52 intermediate ports 50 and 51. The duct 52 communicates through a bore 53 with the conduit 40 which is held by a nipple 54 in communication with the pressure port 50, a pressure spring 55 and a ball 56 constituting a check valve being interposed, such check valve normally closing the discharge port 50 without interfering with the communication between the bypass duct 52 and the conduit 40.

The suction port 51 communicates with an oil tank 57 through a pipe 58. A relief valve 59 constituted by a ball is normally pressed by a spring 60 against the lower end of bore 53, the counter-bore 61 accommodating the spring 60 and the ball 59 communicating with the suction port 51 by a bore 62.

The plunger 43 is provided with an axial bore 63 and between its ends with a section 64 of reduced diameter providing for a clearance 65 between the plunger 43 and the wall of bore 49. This clearance communicates with the bore 63 by a transverse bore 66. The top of plunger 43 is provided with a check valve 67 adapted to close bore 63, such check valve being formed by a disk held in place by a split ring within a recess provided in the top of plunger 43. A groove 69 extends upwardly from port 51.

The pump P functions as follows:

When the plunger 43 is in its uppermost position, the clearance 65 will register with the groove 69. When the plunger 43 descends, it will, therefore, suck oil into the space 70 at the top of bore 49 from tank 57 through pipe 58, suction port 51, clearance 65, groove 69, transverse bore 66, and bore 63 past check valve 67. Let it be assumed that the vehicle is heavily loaded and is started with the clamp 36, 37 still being open. The main springs 28, 29 are compressed to such an extent that link 24 will keep plunger 43 half way between its uppermost position and the position shown. The distance through which the wheels 22 may move up and down relative to the body is thus limited to less than half its normal magnitude. When the vehicle starts to move, the unevenness of the road forces the wheels 22 up and down. The consequent reciprocation of plunger 43 is limited to the upper portion of its stroke in which the plunger covers the bypass duct 52. Therefore, the oil sucked into space 70 is fed past check valve 56 into the conduit 40 thereby imparting a stepwise movement to stop 37 intermittently closing the clamp 36, 37, whereby the additional spring 30 is rendered effective to reinforce the main springs 28 and 29 and to lift the body so as to restore the normal clearance between the body and the half axles 18 and 19. Excessive liquid fed into conduit 40 after plunger 43 has reached its rearmost position will be discharged past check valve 59 through bore 62, port 51, and pipe 58 into the tank 57.

As soon as the body has been lifted to such an extent that the reciprocating plunger 43 will intermittently uncover the groove 69, the fluid under pressure in conduit 40 is permitted to return through bore 53, bypass duct 52, cylinder bore 49, groove 69, suction port 51, and pipe 58 to the tank 57. The groove 69 has such a narrow cross section that such return takes place gradually. Hence, it will appear that when the body of the vehicle has been lifted by the reinforcing effect of spring 30 to such an extent that the plunger 43 reciprocates within the lower section of its stroke in which it uncovers the groove 69 frequently, the pressure produced in conduit 40 will just suffice to keep the clamp closed.

When the vehicle carries a small load, the plunger 43 reciprocates from the start of the vehicle within the lower section of its stroke in which it uncovers the groove 69 and will produce no pressure in conduit 40 leaving stop 37 in its ineffective position. Thus, the groove 69 constitutes a means rendering the pump unable to produce pressure whenever downward motion of the wheel 22 relative to the body exceeds a predetermined limit. Therefore, the spring 30 will act as a stabilizer spring only and will not reinforce the springs 28 and 29.

When the plunger 43 reciprocates primarily in the upper portion of its stroke, it will feed fluid under pressure, even though occasionally the groove 69 may be uncovered by the plunger coincidentally to a considerable expansion of spring 28. By suitably choosing the location of the transverse bore 52 and of the groove 69 the position of the wheel at which the clamp 36, 37 is rendered effective may be selected as desired. By suitably dimensioning the cross section of the bore 52, the groove 69 and the plunger 43, the speed of operation of the clamp may be determined as desired. For normal passenger cars it will generally suffice to apply the additional spring 30 to the rear wheels only as the load imposed on the front wheels is subject to much smaller fluctuations. When the invention is applied to buses or vehicles equipped with a motor in their rear ends, we prefer to apply our invention to the rear wheels and to the front wheels.

From the foregoing explanation it will appear that our improved spring arrangement functions equally well at all loads imposed on the vehicle. Even though the main springs 28 and 29 reinforced by the additional spring 30 will impart superior riding qualities to the vehicle under full load, the springs will still be soft and smooth in operation when the load of the vehicle is reduced to a fraction, because under such conditions the bodily movement of spring 30 with respect to the body of the vehicle will not be restrained by the stops 36, 37. Yet the spring 30 will function by engagement with stop 37 to prevent the springs 28 and 29 from being compressed to the uttermost limit and to cushion a consequent shock. The normal average clearance between the wheel axles and the frame is automatically maintained by the actuating mechanism P, irrespective of the load. Hence, a full load is not liable to press down the body excessively, nor will the springs lift the body unduly when the load is small. Also, the power supplied to the actuating mechanism need not be supplied by the engine or the battery of the car or by manual operation. Nevertheless, our improved springing arrangement requires a minimum of parts and is simple and reliable in operation. The additional spring 30 serves the dual function of acting as a stabilizer spring and as an additional spring reinforcing the main springs.

While we have described our invention with reference to a preferred embodiment thereof, we wish it to be clearly understood that the same is not limited to the details thereof, but is capable of numerous modifications within the scope of the appended claims.

What we claim is:

1. In a vehicle, the combination comprising a body, a pair of wheels, members for guiding said wheels relative to said body independently of each other, springs individually coordinated to said wheels and mounted on said members and said body to restrain said relative motion, a torsional stabilizer spring rod mounted on said body transversely thereof, torsion-transmitting means on the ends of said spring rod for connection with said members causing said spring rod to be flexed by differential up-and-down motion of said wheels, said spring rod being provided between its ends with a transverse extension, settable means coordinated to said spring rod and to said body, said settable means being settable to an effective position and an ineffective position and adapted, when in said effective position, to engage said extension and to thereby restrain movement of said extension relative to said body in response to synchronous up-and-down motion of said wheels, and actuating means operated by up-and-down movement of at least one of said wheels for automatically setting said settable means from one of said positions to the other.

2. In a vehicle, the combination set forth in claim 1, in which said spring rod is bent to form a loop between its ends, such loop constituting said transverse extension.

3. In a vehicle, the combination comprising a body, a pair of wheels, springs supporting said body on said wheels, a torsional stabilizer spring rod journalled on said body to extend transversely thereof, torsion-transmitting means at the ends of said spring rod connected with said wheels for operation thereby causing said spring rod to be flexed by differential up-and-down motion of said wheels, said spring rod being provided between its ends with a transverse extension, settable means mounted on said body and settable to an effective position and an ineffective position and adapted, when in said effective position, to restrain movement of said extension relative to said body, automatic means including a fluid-operable ram mounted on said body and connected to said settable means to automatically set the same to said effective position by fluid pressure thereof, a pump driven directly by up-and-down motion of one of said wheels, and a conduit connecting said pump to said ram.

4. In a vehicle, the combination comprising a body, a pair of wheels, springs supporting said body on said wheels, a torsional stabilizer spring rod journalled on said body to extend transversely thereof, torsion-transmitting means at the ends of said spring rod connected with said wheels for operation thereby causing said spring rod to be flexed by differential up-and-down motion of said wheels, said spring rod being provided between its ends with a transverse extension, a first stop fixed to said body, a second movable stop mounted on said body for movement towards and away from said first stop, said extension being positioned between said stops, a fluid-operable ram mounted on said body for automatically moving said second stop, a pump directly operated by up-and-down motion of at least one of said wheels, and a conduit connecting said pump to said ram.

5. In a vehicle, the combination comprising a body, a pair of wheels, springs supporting said body on said wheels, a stabilizer spring movably mounted on said body, means connected with said stabilizer spring and said wheels and adapted to flex said stabilizer spring in response to differential up-and-down motion of said wheels, fluid-operable means mounted on said body for engagement with said stabilizer spring and adapted to restrain movement of the same relative to said body, a pump driven directly by up-and-down motion of one of said wheels, and a conduit connecting said pump to said fluid-operable means, said pump having a suction port and a pressure port and a bypass conduit connecting said ports and being provided with movable means controlling said bypass and opening the same whenever downward motion of said last-mentioned wheel exceeds a predetermined limit.

6. In a vehicle, the combination set forth in claim 5, in which said pump comprises a pump cylinder mounted on said body, and a plunger movable in said cylinder and connected to one of said wheels, said movable means controlling said bypass being constituted by said plunger.

7. In a vehicle, the combination comprising a body, a pair of wheels, pivotal members for guiding said wheels relative to said body, helical springs for supporting said body on said members, a transverse stabilizer spring journalled on said body and having arms at its ends connected to said members and adapted to flex said stabilizer spring in response to differential movements of said wheels relative to said body, a lateral extension being provided on said stabilizer spring intermediate its ends, a clamp mounted on said body and straddling said extension, a hydraulic ram adapted to close said clamp on said extension, a pump mounted on said body and having a plunger connected to one of said members for actuation thereby, a conduit connecting said pump to said hydraulic ram, said pump being provided with a suction port, with a pressure port and with a bypass duct connecting said ports, said duct being adapted to be controlled by said plunger and to be opened by the same whenever downward motion of the last-mentioned one of said members relative to said body exceeds a predetermined limit.

8. In a vehicle, the combination set forth in claim 7, in which said pump includes said plunger and a cylinder body provided with a bore which slidingly accommodates said plunger and is provided with said pressure port, said suction port and said bypass duct intermediate said ports, said duct communicating with said conduit and being adapted to communicate through said bore with said suction port when the latter is uncovered by said plunger.

9. In a vehicle, the combination comprising a body, wheels, springs for supporting said body on said wheels, a spring-adjusting mechanism coordinated to at least one of said springs, fluid-operable means connected with said mechanism for actuation thereof, a pump reciprocated by up-and-down motion of one of said wheels, said pump having a suction port, a pressure port and a bypass duct connecting said ports, a conduit connecting said pressure port to said fluid-operable means, and movable means controlled by said last-mentioned wheel and adapted to control said bypass duct and to open the same whenever downward motion of said wheels exceeds a predetermined limit.

10. In a vehicle, the combination set forth in claim 9, in which said pump includes a plunger and a cylinder body, the latter being provided with a bore which slidingly accommodates said plunger and is provided with said pressure port, said suction port and said bypass duct intermediate said ports, said movable means adapted to control said bypass duct being constituted by said plunger.

11. In a vehicle, the combination comprising a body, a pair of wheels, members for guiding said wheels relative to said body, springs individually coordinated to said wheels and mounted on said members and said body to restrain said relative motion, a single additional spring movably mounted on said body and connected to both of said members, settable means coordinated to said additional spring and to said body, said last-mentioned means being automatically settable to an effective position and to an ineffective position and operative in said effective positional to restrain movement of said additional spring relative to said body, and actuating means for actuating said settable means from one of said positions to the other, said actuating means producing operating energy for said settable means by up-and-down movement of one of said wheels and including means for disabling said actuating means upon downward movement of said one wheel in excess of a predetermined limit.

12. In a vehicle with a frame, wheels, and guide means on each side of said vehicle between said frame and said wheels, the combination of a spring system for individually spring suspending said wheels on said frame comprising springs individually coordinated to said wheels, additional spring means in said system common to both sides of said vehicle, adjusting means common to both sides of said vehicle including actuating means for changing the effectiveness of said additional spring means, said actuating means being operative for automatically controlling said adjusting means in response to the load on said wheels and actuated by the up-and-down movement of at least one of said wheels to thereby maintain the distance between said frame and said wheels substantially constant.

13. In a vehicle, the combination comprising a superstructure, a pair of wheels, a pair of half axles supporting said wheels, means for pivotally connecting said half axles to said superstructure allowing said half axles to swing with respect to said superstructure in an up and down movement independently of each other, springs individually coordinated to said wheels and mounted between said half axles and said superstructure to restrain the motion of said wheels relative to said superstructure, common torsion bar means for both half axles extending transversely to said vehicle from one side thereof to the other, means connecting the ends of said torsion bar means to said half axles in such a manner that said torsion bar means is effective only upon unequal springing movements of said wheels and is ineffective upon equal springing movements of said wheels, stop means provided on said superstructure essentially at the longitudinal center of said torsion bar means and cooperating with said torsion bar means, adjusting means including actuating means located at a point of said vehicle remote from said stop means and for adjusting said stop means from an ineffective position with respect to equal springing movements of said wheels to an effective position in which the free turning movement of said torsion bar means is limited to a predetermined amount within the springing movement of said two half axles, said actuating means being operative to produce operating energy for said stop means by the up-and-down movement of at least one of said half axles with respect to said superstructure.

14. In a vehicle, the combination set forth in claim 13, wherein said common torsion bar means comprises a bar having two bent ends operatively connected to said half axles and a U-shaped middle portion of said torsion bar means cooperating with said adjustable stop means.

15. In a vehicle, the combination comprising a body, a pair of wheels, members for guiding said wheels relative to said body, individual spring means mounted on said members for supporting said body on said wheels for restraining said relative motion, a single additional spring movably mounted on said body and connected to both of said members, adjustable means operatively connected to said additional spring and to said body, said adjustable means being adjustable to an effective position and to an ineffective position and adapted, when in said effective position, to restrain movement of said additional spring relative to said body, and actuating means for automatically actuating said adjustable means from one of said positions to the other, said actuating means being operated by up-and-down motion of one of said wheels and including means for disabling said actuating means upon downward motion of said one wheel in excess of a predetermined limit.

16. In a vehicle, the combination comprising a body, a pair of wheels, members for guiding said wheels relative to said body independently of each other, including spring means mounted on said members for supporting said body on said wheels for restraining said relative motion, an additional spring movably mounted on said body and connected to both of said members for bodily movement relative to said body in response to synchronous up-and-down motion of said wheels and for flexing in response to differential up-and-down motion of said wheels, adjustable means operatively connected to said additional spring and to said body, said adjustable means being adjustable to an effective position and to an ineffective position and adapted, when in said effective position, to restrain said synchronous movement, and actuating means for automatically actuating said adjustable means from one of said positions to the other, said actuating means being operated by up-and-down motion of one of said wheels and including means for disabling said actuating means upon downward motion of said one wheel in excess of a predetermined limit.

17. In a vehicle, the combination comprising a body, a pair of wheels, members for guiding said wheels relative to said body, individual spring means mounted on said members for supporting said body on said wheels for restraining said relative motion, a single additional spring movably mounted on said body and connected to both of said members, adjustable means operatively connected to said additional spring and to said body, said adjustable means being adjustable to an effective position and to an ineffective position and adapted, when in said effective position, to restrain movement of said additional spring relative to said body, and an actuating means for automatically actuating said adjustable means from one of said positions to the other, said adjustable means comprising a clamp mounted on said body and adapted to engage said additional spring on opposite sides thereof.

18. In a vehicle, the combination comprising a body, a pair of wheels, members for guiding said wheels relative to said body, individual spring means mounted on said members for supporting said body on said wheels for restraining said relative motion, a single additional spring movably mounted on said body and connected to both of said members, adjustable means operatively connected to said additional spring and to said body, said adjustable means being adjustable to an effective position and to an ineffective position and adapted, when in said effective position, to restrain movement of said additional spring relative to said body, and an actuating means for automatically actuating said adjustable means from one of said positions to the other, said adjustable means comprising a pair of stops mounted on said body and adapted to engage said additional spring on opposite sides thereof, one of said stops being fixed to said body and the other one of said stops being movable towards and away from said one stop.

19. In a vehicle, the combination comprising a body, a pair of wheels, members for guiding said wheels relative to said body, individual spring means mounted on said members for supporting said body on said wheels for restraining said relative motion, a single additional spring movably mounted on said body and connected to both of said members, adjustable means operatively connected to said additional spring and to said body, said adjustable means being adjustable to an effective position and to an ineffective position and adapted, when in said effective position, to restrain movement of said additional spring relative to said body, and an actuating means for automatically actuating said adjustable means from one of said positions to the other, said actuating means being operative to produce operating energy for said adjustable means by up-and-down motion of at least one of said wheels and to activate said actuating means.

20. In a vehicle, the combination comprising a body, a pair of wheels, members for guiding said wheels relative to said body, individual spring means mounted on said members for supporting said body on said wheels for restraining said relative motion, a single additional spring movably mounted on said body and connected to both of said members, adjustable means operatively connected to said additional spring and to said body, said adjustable means being adjustable to an effective position and to an ineffective position and adapted, when in said effective position, to restrain movement of said additional spring relative to said body, and an actuating means for automatically actuating said adjustable means from one of said positions to the other, said actuating means including a fluid-operable mechanism operatively connected with said adjustable means to adjust the same to said effective position, a pump mounted to be directly driven by up-and-down motion of one of said wheels, and a conduit connecting said pump and said fluid-operable mechanism.

21. In a vehicle, the combination comprising a body, a pair of wheels, members for guiding said wheels relative to said body, individual spring means mounted on said members for supporting said body on said wheels for restraining said relative motion, a single additional spring movably mounted on said body and connected to both of said members, adjustable means operatively connected to said additional spring and to said body, said adjustable means being adjustable to an effective position and to an ineffective position and adapted, when in said effective position, to restrain movement of said additional spring relative to said body, and an actuating means for automatically actuating said adjustable means from one of said positions to the other, a fluid-operable actuating mechanism coordinated to said adjustable means to adjust the same to said effective position, a pump operated by up-and-down motion of at least one of said wheels, and a conduit connecting said pump to said fluid-operable actuating mechanism, said pump being provided with means rendering said pump ineffectual to produce pressure upon downward motion of said wheel relative to said body in excess of a predetermined limit.

22. In a vehicle, the combination comprising a superstructure, a pair of wheels, a pair of half axles supporting said wheels, means for pivotally connecting said half axles to said superstructure allowing said half axles to swing with respect to said superstructure in an up-and-down movement independently of each other, springs individually coordinated to said wheels and mounted between said half axles and said superstructure to restrain the motion of said wheels relative to said superstructure, common torsion bar means for both half axles extending transversely to said vehicle from one side thereof to the other, means connecting the ends of said torsion bar means to said half axles in such a manner that said torsion bar means is effective only upon unequal springing movements of said wheels and is ineffective upon equal springing movements of said wheels, stop means provided on said superstructure essentially at the longitudinal center of said torsion bar means and cooperating with said torsion bar means, adjusting means for said stop means adapted to be adjusted from a point of said vehicle remote from said stop means and for adjusting said stop means from an ineffective position with respect to equal springing movements of said wheels to an effective position in which the free turning movement of said torsion bar means is limited to a predetermined amount within the springing movement of said two half axles, said common torsion bar means comprising a bar having two bent ends operatively connected to said half axles and a U-shaped middle portion of said torsion bar means cooperating with said adjustable stop means, said stop means comprising two stop elements arranged on both sides of said U-shaped middle portion and alternately cooperating with said middle portion.

23. In a vehicle, the combination comprising a body, at least one pair of wheels disposed on opposite sides of the vehicle, first spring means for individually supporting the wheels to said body, stabilizer spring means operatively connecting said wheels to each other, adjusting means including actuating means for adjusting said stabilizer spring means, said actuating means deriving the operating energy for activating said adjusting means by the up and down motion of one of said wheels with respect to the body, said adjusting means including means adjustable in dependence of the actuation of said actuating means, said last-mentioned means in a first adjusted position being operable within a predetermined range of synchronous springing movement of both wheels to render said stabilizer spring means ineffective against said synchronous movement and allow said synchronous movement without resistance by said stabilizer spring means, said last-mentioned means in said first position admitting said stabilizer spring means effective as a stabilizer means to yieldingly resist opposite springing movements of said both wheels, and said last-mentioned means in a second adjusted position being operable to render said stabilizer spring means effective to resist said synchronous movement of both wheels within said predetermined range as well as to resist opposite springing movements of said wheels.

References Cited in the file of this patent

UNITED STATES PATENTS

| | | |
|---|---|---|
| 1,291,016 | Kellogg | Jan. 14, 1919 |
| 2,490,311 | Rostu | Dec. 6, 1949 |
| 2,577,761 | Hickman | Dec. 11, 1951 |
| 2,592,391 | Butterfield | Apr. 8, 1952 |
| 2,687,311 | Nallinger | Aug. 24, 1954 |
| 2,733,934 | Muller | Feb. 7, 1956 |
| 2,808,270 | Muller | Oct. 1, 1957 |
| 2,840,390 | Walker | June 24, 1958 |

FOREIGN PATENTS

| | | |
|---|---|---|
| 767,620 | France | May 7, 1934 |
| 681,645 | Great Britain | Oct. 29, 1952 |